Patented July 3, 1934

1,964,754

UNITED STATES PATENT OFFICE 1,964,754

PRODUCTION OF STARCH AND GLUTINOUS MATERIALS

Henry Maltwood Williams, Wellington, New Zealand, assignor to William Joseph Bellingham, Wellington, New Zealand No Drawing. Application June 7, 1933, Serial No. 674,771. In New Zealand December 8, 1932

9 Claims. (Cl. 99—10)

This invention relates to materials of a starch and glutinous nature intended primarily but not necessarily to improve foodstuffs or the like and the process of procuring such materials.

Hitherto cereal foodstuffs have been found by analysis to be lacking in the quantity of some compounds for example protein in flour in the form of gluten, while being overburdened in the quantity of some other compounds for example starch, etc.

It is the object of the present invention to produce in the case of for instance bread or the like, recognized suitable ratios of carbohydrates, for example starch, etc., gluten, ash and fat contents balanced as desired, the bread having a greater bulk, better texture, improved keeping qualities and being a better food value than heretofore and in addition the process lends itself easily to the production of foods suitable for specific purposes, being cheap to manufacture by the process hereinafter described.

According to the invention a proved baker's "sponge" is diluted by adding a salt solution which retards fermentation and is then treated by the further step which allows by precipitation the separation of some of the flour elements in the mixture. The gluten and solubles held in the gluten rise and are then drawn off leaving a residue; the latter being mostly starch, is made use of as may be required in manufactures, while the former is used to make up the gluten or other content of, for example bread or the like. It has been found in practice that some of the starch is held in suspension in the gluten and solubles, and to obtain pure gluten without any starch or other solubles it is a further step forming part of this invention to subject the drawn off material to a washing in pure water.

An ordinary baker's "sponge" comprises flour mixed with water and yeast at a temperature approximately 80° Fahr., usually the proportion would be an equal weight of flour to water with yeast as desired. "Proving" the sponge comprises allowing it to ferment until it has been raised to its maximum height and starts to drop. This rising and dropping is the result of the glutinous material confining for a time the gas created by the yeast fermentation and expanding the glutinous material until it breaks and the gas escapes.

The strength of the salt solution required is varied according to the time the glutinous material is to be kept and is further governed by the strength of the gluten in the flour being used, and further also the salt solution is sufficiently strong to prevent the degradation of the gluten during the period that precipitation takes place.

The salt solution is added to the sponge and mixed thoroughly therewith. The addition of the salt retards excessive fermentation during the time that the mixture is allowed to stand and at the same time strengthening the gluten that is, it improves the condition of the gluten for baking purposes. The starch is then allowed to precipitate or deliberately settle from the mixture and thereafter the glutinous material, suspended by the gas confined within it from t - time the "sponge" is proved, is drawn off.

The drawn off glutinous material being in a prefermented, that is, a predigested state is then in a fit condition for mixing with foodstuffs for the better baking of same and with the additional object of adjusting the balance of food values so desirable in specific purposes.

During the precipitation or settling of the mixture, it is alleged that in addition to the changes which take place in a baker's sponge, further changes take place in the character or chemical condition of the gluten which have a softening effect on it giving an additional elasticity and thus making the gluten more suitable for baking purposes; while a further consequence of such alleged chemical change is that the changed sponge gluten has become a suitable agent to similarly improve the gluten content of the other foodstuffs or the flour used in the final dough imparting to the latter gluten content characteristics similar to the changed sponge gluten.

It will be evident that the particular process of production and the ingredients and proportions thereof in the mixture may be varied without departing from the spirit or scope of the invention.

What is claimed is,

1. A method of separating starchy materials from glutinous materials in a baker's sponge comprising proving the sponge and diluting said sponge in a ferment retarding solution.

2. A method of separating starchy materials from glutinous materials in a baker's sponge comprising proving the sponge, mixing the said sponge with a ferment retarding solution, allowing the glutinous material to rise and the starchy material to settle actuated by gravitation.

3. A method in accordance with claim 2 in which the retarding solution consists of common salt solution in order to maintain glutinous material in suspension, thereby permitting the starchy material to settle and thereupon removing the gluten top.

4. A method in accordance with claim 2 in which the retarded solution consists of a common salt solution to maintain glutinous material in suspension, thereby permitting the starchy material to settle, the strength of the salt solution being adjusted in accordance with the length of time the glutinous material is to be retained and the strength of the gluten in the flour in order to prevent degradation of the gluten during separation.

5. A method of separating starch from glutinous materials contained in flour, comprising making a baker's sponge, allowing the sponge to prove until properly aerated and mixing the sponge with sodium chloride solution in such a way that a sufficient amount of gas is retained in the glutinous material to cause the glutinous material to float while the starch settles actuated by gravity.

6. A method of preparing gluten for making up the gluten content of bread, comprising making a baker's sponge, allowing the sponge to prove until properly aerated and mixing the sponge with sodium chloride solution, whereby glutinous material is caused to float above the rest of the solution.

7. A method of separating starch from glutinous materials contained in flour, comprising making a baker's sponge, allowing the sponge to prove until properly aerated and mixing the sponge with sodium chloride solution, whereby the glutinous material is caused to float while the starch settles actuated by gravity; and finally washing the gluten top to remove salty and starchy material adhering thereto.

8. A method of preparing gluten comprising making a baker's sponge, allowing the sponge to prove until properly aerated and mixing the sponge with sodium chloride solution thus retarding excessive fermentation and permitting the mixture to stand, causing the glutinous material to float above the rest of the solution, thereby improving the condition of the gluten.

9. A method of preparing gluten for making up the gluten content of foodstuffs comprising making a baker's sponge, allowing the sponge to prove until properly aerated and mixing the sponge with sodium chloride solution thus retarding excessive fermentation and permitting the mixture to stand, causing the gluten to float above the rest of the solution, thereby making the gluten capable of improving glutinous material in foodstuff with which said gluten may be mixed.

HENRY MALTWOOD WILLIAMS.